(12) United States Patent
Martin et al.

(10) Patent No.: US 8,365,083 B2
(45) Date of Patent: Jan. 29, 2013

(54) CUSTOMIZABLE, CATEGORICALLY ORGANIZED GRAPHICAL USER INTERFACE FOR UTILIZING ONLINE AND LOCAL CONTENT

(75) Inventors: Geoffrey Martin, Scotts Valley, CA (US); Frank E. La Fetra, Jr., Sunnyvale, CA (US); Ruth Ann Lim, Santa Clara, CA (US); Janet L. Sailor, San Leandro, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1981 days.

(21) Appl. No.: 10/877,583

(22) Filed: Jun. 25, 2004

(65) Prior Publication Data

US 2005/0289475 A1    Dec. 29, 2005

(51) Int. Cl.
 *G06F 3/048* (2006.01)
(52) U.S. Cl. .................................. 715/769; 715/765
(58) Field of Classification Search .................. 715/769, 715/205–208
See application file for complete search history.

(56) References Cited

U.S. PATENT DOCUMENTS

| | | | |
|---|---|---|---|
| 5,434,965 A | 7/1995 | Matheny et al. | |
| 5,530,865 A | 6/1996 | Owens et al. | |
| 5,535,321 A | 7/1996 | Massaro et al. | |
| 5,596,702 A | 1/1997 | Stucka et al. | |
| 5,680,323 A | 10/1997 | Barnard | |
| 5,745,111 A | 4/1998 | Cline et al. | |
| 5,898,434 A | 4/1999 | Small et al. | |
| 5,905,493 A | 5/1999 | Belzer et al. | |
| 6,262,724 B1 | 7/2001 | Crow et al. | |
| 6,262,726 B1 | 7/2001 | Stedman et al. | |
| 6,342,905 B1 | 1/2002 | Diedrich et al. | |
| 6,408,344 B1 | 6/2002 | Sakai | |
| 6,446,065 B1 | 9/2002 | Nishioka et al. | |
| 6,452,609 B1 | 9/2002 | Katinsky et al. | |
| 6,466,241 B1 | 10/2002 | Schindler | |
| 6,473,096 B1 | 10/2002 | Kobayashi et al. | |
| 6,483,523 B1 | 11/2002 | Feng | |
| 6,532,007 B1 | 3/2003 | Matsuda | |
| 6,587,127 B1 | 7/2003 | Leeke et al. | |
| 6,731,312 B2 | 5/2004 | Robbin | |
| 6,968,364 B1 | 11/2005 | Wong et al. | |
| 7,003,726 B2 | 2/2006 | Walker et al. | |
| 7,020,704 B1 * | 3/2006 | Lipscomb et al. | ............ 709/226 |
| 7,039,643 B2 | 5/2006 | Sena et al. | |
| 7,062,453 B1 | 6/2006 | Clarke | |
| 7,086,007 B1 | 8/2006 | Bushey et al. | |

(Continued)

OTHER PUBLICATIONS

Skiljam, Irfan, "Irfan View, Iview390.pdf", Apr. 2004, 12 pgs.

(Continued)

*Primary Examiner* — Omar Abdul-Ali (57) ABSTRACT

A graphical user interface for accessing, managing, organizing and using local and online content from a personal computer. The graphical user interface is divided into several modules, displayed on the display screen of the computer. Some of these modules are categories, which contain links to content online and on the hard drive of the computer. The user can customize these categories and the links within them to suit his or her personal needs, interests, and tastes. One or more of the modules within the GUI are media players. The user can select content by dragging and dropping a link from the desktop, another application, or a category within the GUI onto the media player. Applications required to access content referred to by links within the categories of the graphical user interface are launched at the time that the GUI is launched.

20 Claims, 6 Drawing Sheets

U.S. PATENT DOCUMENTS

| | | |
|---|---|---|
| 7,174,514 B2 | 2/2007 | Subramaniam et al. |
| 7,395,957 B2 | 7/2008 | Satake |
| 7,430,722 B2 | 9/2008 | Martin et al. |
| 7,899,802 B2 | 3/2011 | Sailor et al. |
| 2001/0021934 A1 | 9/2001 | Yokoi |
| 2001/0056434 A1 | 12/2001 | Kaplan et al. |
| 2002/0059342 A1 | 5/2002 | Gupta et al. |
| 2002/0065849 A1 | 5/2002 | Ferguson et al. |
| 2002/0082730 A1 | 6/2002 | Capps et al. |
| 2002/0089530 A1* | 7/2002 | Markel ............ 345/719 |
| 2002/0118220 A1 | 8/2002 | Lui et al. |
| 2002/0130902 A1 | 9/2002 | Shaouy et al. |
| 2002/0135617 A1 | 9/2002 | Samid |
| 2002/0145627 A1 | 10/2002 | Whitmarsh et al. |
| 2002/0149618 A1 | 10/2002 | Estrada et al. |
| 2002/0169797 A1 | 11/2002 | Hedge et al. |
| 2002/0180803 A1 | 12/2002 | Kaplan et al. |
| 2002/0194151 A1* | 12/2002 | Fenton et al. ............ 707/1 |
| 2002/0196286 A1 | 12/2002 | Taylor et al. |
| 2003/0007003 A1 | 1/2003 | Ostrowski et al. |
| 2003/0014477 A1 | 1/2003 | Oppenheimer et al. |
| 2003/0046401 A1 | 3/2003 | Abbott et al. |
| 2003/0076345 A1 | 4/2003 | Feller et al. |
| 2003/0090516 A1 | 5/2003 | Stein |
| 2003/0120599 A1* | 6/2003 | Agboatwalla et al. ........ 705/50 |
| 2003/0126136 A1 | 7/2003 | Omoigui |
| 2003/0128228 A1 | 7/2003 | Crow et al. |
| 2003/0132970 A1 | 7/2003 | Lehmeier et al. |
| 2003/0137531 A1 | 7/2003 | Katinsky et al. |
| 2003/0170006 A1 | 9/2003 | Bogda et al. |
| 2003/0197727 A1 | 10/2003 | Milius |
| 2003/0221167 A1 | 11/2003 | Goldstein et al. |
| 2003/0233425 A1* | 12/2003 | Lyons et al. ............ 709/217 |
| 2004/0002945 A1 | 1/2004 | Shibata |
| 2004/0003347 A1 | 1/2004 | Saidenberg et al. |
| 2004/0021684 A1 | 2/2004 | B. Millner |
| 2004/0025112 A1 | 2/2004 | Chasen et al. |
| 2004/0051812 A1 | 3/2004 | Hayward |
| 2004/0059776 A1 | 3/2004 | Pitzel et al. |
| 2004/0061720 A1 | 4/2004 | Weber |
| 2004/0064447 A1 | 4/2004 | Simske et al. |
| 2004/0070609 A1 | 4/2004 | Estrada |
| 2004/0148362 A1 | 7/2004 | Friedman |
| 2004/0165007 A1 | 8/2004 | Shafron |
| 2004/0205333 A1 | 10/2004 | Bjorkengren |
| 2004/0216054 A1 | 10/2004 | Mathews et al. |
| 2004/0243694 A1 | 12/2004 | Weast |
| 2004/0250213 A1 | 12/2004 | Shalabi et al. |
| 2004/0268261 A1* | 12/2004 | Elliott et al. ............ 715/716 |
| 2004/0268413 A1 | 12/2004 | Reid et al. |
| 2005/0010589 A1 | 1/2005 | Novak et al. |
| 2005/0021935 A1 | 1/2005 | Schillings et al. |
| 2005/0042591 A1 | 2/2005 | Bloom et al. |
| 2005/0044508 A1 | 2/2005 | Stockton |
| 2005/0044560 A1* | 2/2005 | Kryeziu ............ 725/14 |
| 2005/0065913 A1 | 3/2005 | Lillie et al. |
| 2005/0069225 A1 | 3/2005 | Schneider et al. |
| 2005/0097089 A1 | 5/2005 | Nielsen et al. |
| 2005/0154717 A1 | 7/2005 | Watson et al. |
| 2005/0278698 A1 | 12/2005 | Verco |

OTHER PUBLICATIONS

"Startup Program Loading", Load.pdf, Jun. 26, 2004, 6 pgs.
"Media Player Classic", ver. 6.4.7.3, 2002-2003, screen caps fig. 1-fig.7.
Stream Embedded Compressor/Decompressor, IBM-TDB. vol. 38, issue No. 9, publication data Sep. 1, 1995, 6 pgs.

* cited by examiner

CUSTOMIZABLE, CATEGORICALLY ORGANIZED GRAPHICAL USER INTERFACE FOR UTILIZING ONLINE AND LOCAL CONTENT

RELATED U.S. APPLICATIONS

This application claims priority to the provisional patent applications, Application No. 60/508,439, entitled "A Novel Customizable User Interface for One Click Access to Local and Online Contents," filed with the United States Patent and Trademark Office on Oct. 3, 2003, and assigned to the assignee of the present application.

FIELD OF THE INVENTION

Various embodiments of the present invention relate to the fields of graphical user interfaces and web portals. More specifically, embodiments of the present invention relate to a graphical user interface which a user can customize and use to manage, organize and access local content as well as content on a network.

BACKGROUND OF THE INVENTION

Since the advent of the personal computer, the user environment on the personal computer has continually become more "friendly," i.e. easier for the average person to learn, easier to understand, and easier to use. There are countless software applications available today which allow one to perform a wide range of tasks with a personal computer, regardless of one's extent of computer programming knowledge.

Each software application, for example word processing software, accounting software, media player software, games, etc., is essentially a tool, which allows the user to perform a task. Most applications have an application programming interface, or API, which instructs the operating system of the computer how to operate the program. In most operating systems, a graphical user interface (GUI) allows the user to navigate between and around in the separate applications on a "desktop." Each application has a presence on the desktop, for example an icon. Each application must be turned on, or "launched" as it is needed during the user experience. One way of launching an application from the desktop is by using a mouse to position a floating cursor over the icon and clicking on the icon. Another possibility is to use the GUI to find the application on the hard drive and launch it from there. Each application is separate and distinct from the others. The launching or closing of one application typically does not launch or close another application, unless the operating system is specifically instructed to do so, which requires programming expertise on the part of the user.

One common software application is an internet browser. The API for the internet browser instructs the computer how to make contact with and interact with the internet. The internet, too has become increasingly user friendly. There are currently many "web portals" available to the public. A web portal is a web site which typically has several preset links, organized by category, to many areas of interest. Once the user registers or activates the portal, she can begin to customize the portal to reflect her personal tastes and needs. The web portal is a means of making the world wide web less intimidating to the beginning user. The beginning user can "surf" through the portal's suggested links without being overwhelmed by the endless choices available to her on the internet. As for the advanced user, it is a way of making her time on the internet more efficient. She can tailor a portal to her specific needs. For example, she can log on the internet, check her stocks, read the news, find out about a sale at a favorite shop, how her favorite team fared the previous night, and see the local weather, all from one page, her portal. Otherwise, the user would have had to go to several separate web sites to gather all of these different pieces of information.

One limitation of web portals is that they do not extend beyond the internet. Other GUIs are designed to access and manage local content only. The high number of available software applications is growing, and thus the number of functions for which the personal computer user employs her computer is also growing. As more and more icons take their place on the desktop, the user environment becomes more and more chaotic. Also the number of products, services and information available to users through the internet is growing and will continue to grow. The burdens of software and internet savvy have grown heavy for the average user and overwhelming for the beginning user. The user experience lacks a common ground interface through which the user can efficiently access and organize local as well as online content.

SUMMARY OF THE INVENTION

Embodiments of the present invention, a customizable desktop graphical user interface for the display screen of a computing resource, are presented. The graphical user interface includes a plurality of on-screen elements, a plurality of user-selectable, user customizable categories displaying user-customizable links to content on a network and content stored in the memory of said computer system, and a media player for launching said content automatically when one of said links is dragged and dropped onto said media player.

BRIEF DESCRIPTION OF DRAWINGS

The present invention is illustrated by way of example, and not by way of limitation, in the figures of the accompanying drawings and in which like reference numerals refer to similar elements and in which:

FIG. 5 is a flowchart demonstrating how content can be opened by clicking on a link in a specialized category within the GUI.

BEST MODE(S) FOR CARRYING OUT THE INVENTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1:
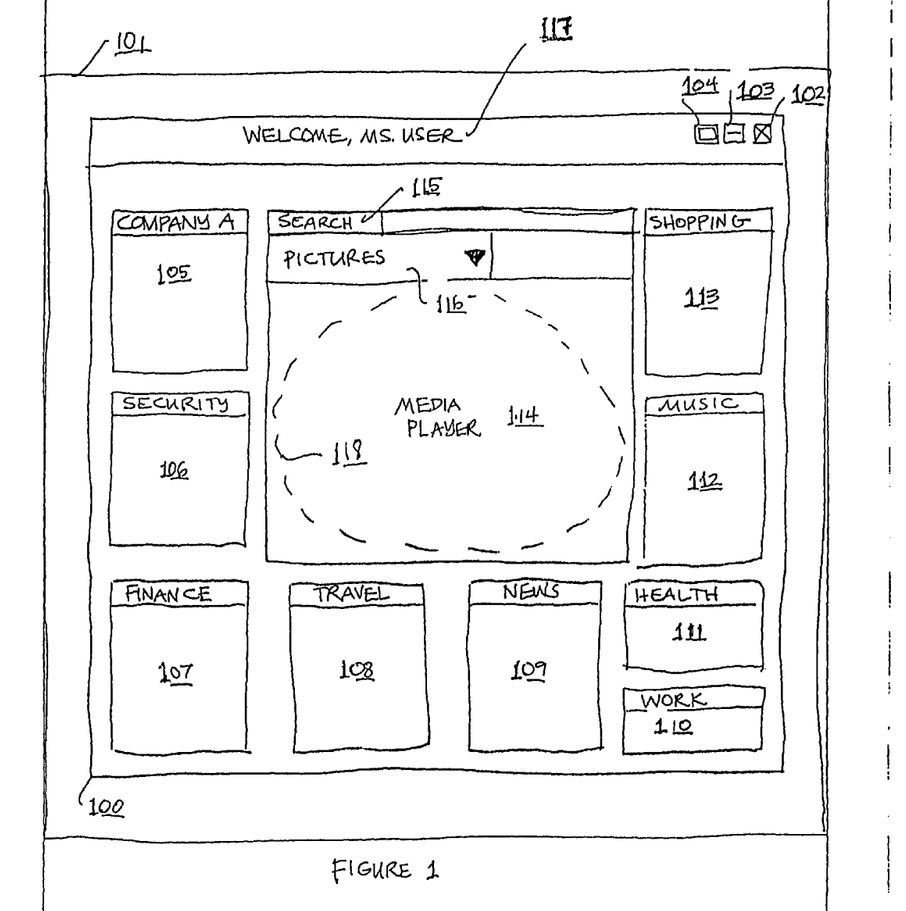
FIG. 1 depicts the GUI as it appears on the desktop of the display screen of the computer. Shown in FIG. 1 are several exemplary categories, as well as a media player and an search bar for searching a network or the computer's hard drive.

FIG. 1 depicts the graphical user interface 100 as it appears on the display screen of a computer. Shown in FIG. 1 are a personalized greeting bar (117), various category modules (106), a media player module (114), and a search bar (115). Upon registration of the software which renders the GUI, the user may provide personal information, allowing the GUI to greet him or her personally 117). The GUI is configured by the manufacturer with certain pre-defined modules. The category modules (106) can be customized by the user, or the user may use them as they are originally defined. Whether or not they are altered by the user, each module carries a unique identifier which does not change. This allows the manufacturer or a permitted business partner to monitor changes made by the user. All such data-collection will adhere to a privacy statement made available to and agreed to by the user.

The graphical user interface 100 appears on the desk top (101) of a computer display screen. The GUI includes multiple modules called categories (106), a module which is a search bar (115), and a module called the media player window (114). The media player window is capable of displaying pictures, playing videos, playing music as well as other media file types. The media player window also includes a sensitive area for launching selected content. The user can open content by dragging a link from a category within the GUI, or from the desktop or from another application and dropping the link onto the sensitive area of the media player window. The GUI also includes a personalized greeting bar (117), and buttons for maximizing, minimizing and hiding the GUI (103). The user can change the size of the GUI and the location of the GUI on the display screen. A category can contain links to content online as well as on the hard drive of the computer the GUI is installed on. In one embodiment, categories also contain links to content found on other computers in a network. The GUI is supplied to the user already equipped with default categories containing links to content online and on the hard drive of the computer.

Once the GUI is installed on his computer, the user can begin to customize the categories. The user can alter the titles of the categories, hide categories, delete categories, add new categories, move categories around within the GUI, and change the sizes of the categories. The user can also delete, modify and add new links to categories. The user can choose where a particular link is displayed within a category. In one embodiment, all pre-defined categories have a unique identifier. While a user may change the title of the category or the links contained within it, the unique identifier is non-customizable. The GUI supports a "reset to defaults" functionality which hides user-defined categories and links and restores the GUI to its original appearance.

In one embodiment of the present invention, the changes made by the user are recorded so that the administrator of the GUI can evaluate the user's use of the GUI. Data recorded for this purpose will be maintained in a data file to be read by the GUI's underlying processes or an external process. Said data files can be made available to the GUI administrator and/or its business partners, in a way that is compatible with the privacy policies agreed to by the user. For example, the GUI may accumulate statistics on the number of user-defined links and categories, without gathering data regarding the specifics of the content. The GUI may record data such as how many user-defined links the user creates and how often in aggregate the user uses said user-defined links and how many user-defined links are to local vs. network content. The GUI is capable of compiling other useful information, such as a measure of user click-throughs from the GUI to partner links and applications, a list of most frequently used applications, and a list of most frequently used websites. Business partners can utilize these statistics to evaluate the effectiveness of their products and advertisement campaigns.

The GUI also contains a search bar (115). When the user enters text or a phrase into the search bar, the GUI automatically sends the search request to a search engine on a network, such as the internet. This can be a specific user-selected search engine, or a combination of search engines. The web page displaying the results of this search then appears to the user on the display screen. The media player (114) is capable of playing multiple forms of media, and in one embodiment is capable of displaying word processor documents, book keeping software spreadsheets, etc. The media player is not limited to playing music or videos. It is a multi-purpose player. The media player contains a sensitive area (118). The user can open content referred to by any link on the desktop or within any category in the GUI by simply dragging the link from its category onto the sensitive area of the media player. The user can also open content by clicking on a link within a category.

Figure 2:
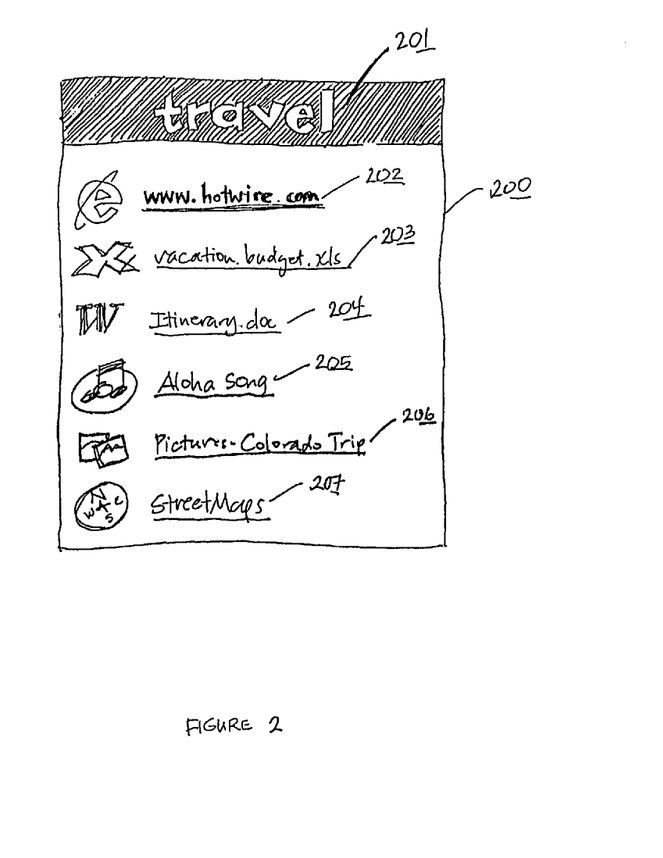
FIG. 2 depicts a category within the GUI, including links to online content, local content, and an application.

FIG. 2 depicts a category (200) within the GUI. The title 201 of the category can be modified by the user or a third party. The category 200 contains links to content online (202), and links to content on the hard drive of the computer system (203). Links to content on the hard drive may include, but are not limited to, spreadsheets (203), word processor documents (204), music files (205), picture files (206), and applications (207). The GUI is configured by the manufacturer with certain predefined links. The links can be customized by the user, or the user may user them as they are originally supplied. Predefined links may be hidden by the user, yet retained as a default setting. In one embodiment, the appearance of a link in the GUI changes visibly (202) when the content referred to by the link changes, whether the content is online or on the hard drive. In one embodiment, the font of said link to content which has changed may appear in bold font, while the other links do not appear in bold font. If the content referred to by the link is erased, deleted, omitted or ceases to exist, the link is deleted from the user's view in the GUI in a preferred embodiment. The selection of a link to online content triggers the network browser application to go to the desired URL and display the selected content from the network. In another embodiment, online content is cached at predetermined intervals. The selection of a link to cached content triggers the GUI to display cached network content.

Categories within the GUI have unique identifiers. A unique identifiers allow a third party, e.g. the GUI administrator, to properly match and track any pre-defined category back to the default definition of the pre-defined category, regardless of how the user has renamed the category. The unique identifier is not the same as the category title (201)

displayed to the user. In one embodiment, user-defined categories appear distinctly different from pre-defined categories within the GUI.

Certain categories are pre-defined to open content with a certain application. In one embodiment, a module predefined with the title: "My Music" is predefined to open content with a music media player application, through the media player window within the GUI. That is, the GUI will attempt to open any link contained in the My Music module with a music media player. Alternatively, if a link to a music file is kept in a folder called "Shopping," the GUI will consult a file association table (see Table 1, below) before opening the selected content.

In general, when a link is selected by the user, the GUI uses the file association table (see Table 1, below) to map the requested content to the appropriate application. In this way, the GUI matches the file type with the proper application, which was already launched with the launching of the GUI. The GUI instructs the proper application with API commands, and the content is opened in the correct application.

Figure 3:
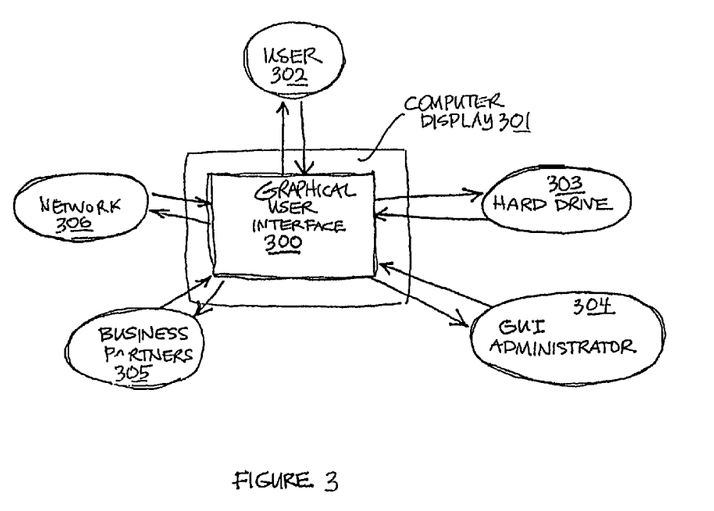
FIG. 3 illustrates the common-ground nature of the present invention. Through the customizable GUI, the user can access a network, such as the internet, the hard drive, the business partners, and the GUI's administrator. The administrator and the business partners also have access to the user through the GUI.

FIG. 3 illustrates the common-ground nature of the present invention. Through the GUI 300, the user can access content from the network (306) as well as the hard drive of the computer system (303). The user can also send content out to the network through the GUI. In one embodiment, the GUI administrator (304) and the GUI administrator's business partners (305) can communicate directly with the user over the network through the GUI 300. As the user personalizes and uses the GUI 300, the GUI administrator (304) and the business partners (305) can begin to formulate a profile of the user (302), and tailor communications to the user (302) through the GUI 300 based on this profile.

Communications can be sent to the user (302) through the GUI (300) via push technology. Push technology is an internet technology that sends prearranged information to users before they actually request it. The type of information sent via push technology is determined in part by the user's profile. In one embodiment, communications to the user or changes to the appearance of the GUI are set to occur at predetermined times, for example holidays.

Applications required for accessing content referred to by the links within the categories of the GUI are launched concurrently with the launching of the GUI itself. The GUI is equipped with a file association table. The file association table enables the GUI to analyze a file extension to determine which application is appropriate for accessing user-selected content. Since all applications run in the background of the GUI, it is all but instantaneous when the GUI opens associated content. For example, when the user selects a link that is a URL, for example "http://www.hp.com," the GUI detects that the internet browser is required to access the desired content. The internet browser is one of the applications launched while the GUI is launching. The user can pre-select the internet browser he or she would like to use, and the browser employed by the GUI may be different from the internet browser employed by the operating system of the computer. The GUI then uses Application Program Interface (API) commands to instruct the appropriate application what to do. In the example of a URL, the GUI uses API commands to instruct an internet browser to open the content referred to by the URL. When the user selects a link such as "MySummerVacation.doc," the GUI detects that the word processor application is required to access this content. The GUI then uses API commands to instruct the word processor application to open the selected file. An example of a file association table is Table 1, below.

TABLE 1

| FILE EXTENSION | APPLICATION REQUIRED FOR ACCESSING CONTENT | WHAT DOES GUI TELL APPLICATION? |
| --- | --- | --- |
| .doc | Word Processor Software | API commands for Word Processor application |
| .xls | Spreadsheet Software | API commands for Spreadsheet application |
| .mpeg | Music Player Software | API commands for Music Player application |

In a preferred embodiment, the GUI contains at least one specialized category. A specialized category is predefined such that any content referred to by a link within the specialized category will automatically open in an application determined by the file association table of the GUI. For example, one embodiment of the GUI contains a specialized category called "My Music." All content referred to by links within the My Music category will automatically open in a music player application, through the center media player window. A link to a music file may be placed in any of the categories, for example a general category called "Shopping." However, when the user selects a link to a music file and the link is in the Shopping category, the GUI utilizes the operating system's file association table to determine which application is appropriate. When the user selects a link to a music file and the link is in the specialized My Music category, the GUI consults its own file association table and automatically opens the file in the music player application, without using the operating system's file association table. The user can choose to put a non-music file in the My Music category. In this case, the GUI will first attempt to open the content using a music player application. If that fails, the GUI will then use the operating system's file association table to determine which application is appropriate.

Figure 4:
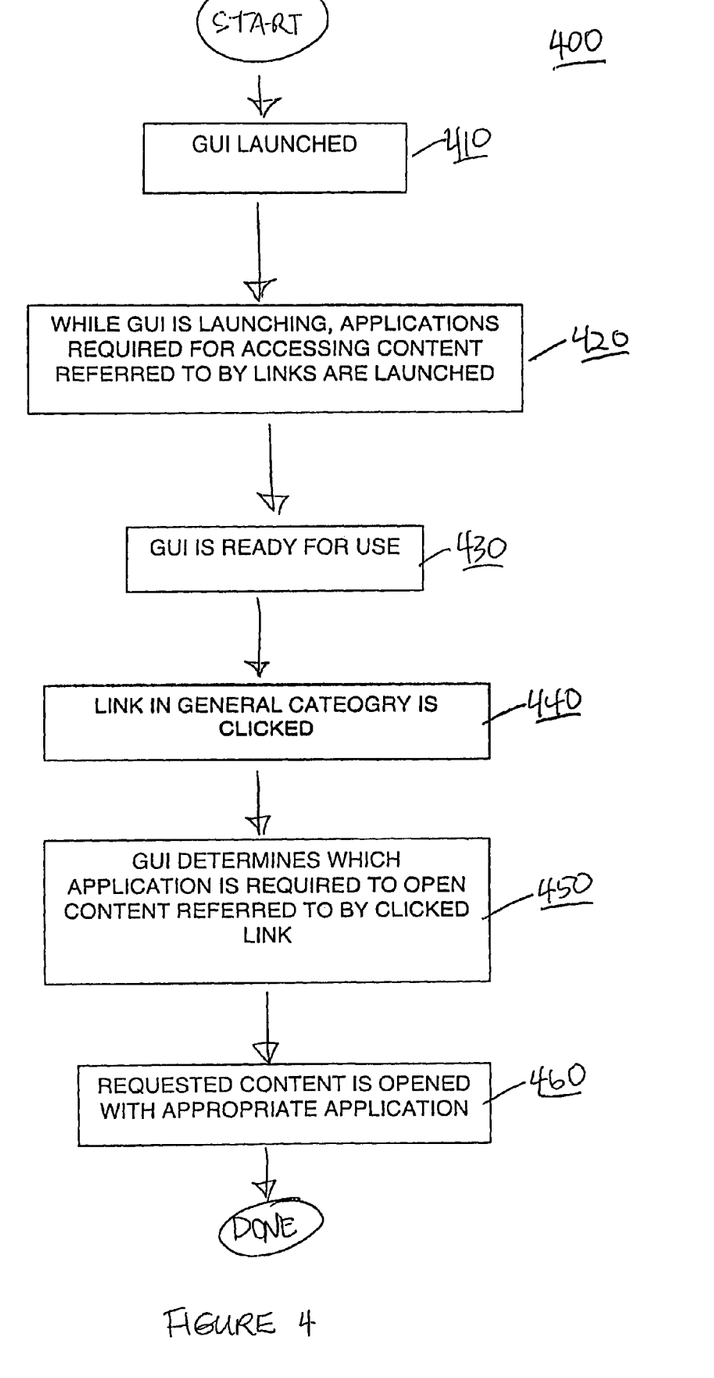
FIG. 4 is a flowchart demonstrating how content can be opened by clicking on a link in a general category within the GUI.

FIG. 4 is a flowchart 400 illustrating one method of opening content using the GUI. First, the GUI is launched (410). As the GUI is launching (410), the necessary applications for accessing content referred to by links within the GUI are launched (420). Then the GUI is ready for use (430). The user can open content by directing the cursor to a link in one of the general categories of the GUI, and then clicking on that link (440). The GUI then utilizes the operating system's file association table to determine which application is required to access the content referred to by the selected link (450). Once the appropriate application is determined, the GUI opens the requested content using the correct application (460).

FIG. 5 is a flowchart 500 illustrating how the user can open content by clicking on a link in a specialized category. First, the GUI is launched (510). As the GUI is launching, the necessary applications for accessing the content referred to by links within the GUI are launched (520). The GUI is then ready for use (530). When a link from a specialized category is selected (540), the GUI consults its own file association table, and automatically opens the content in the appropriate application (550).

Figure 6:
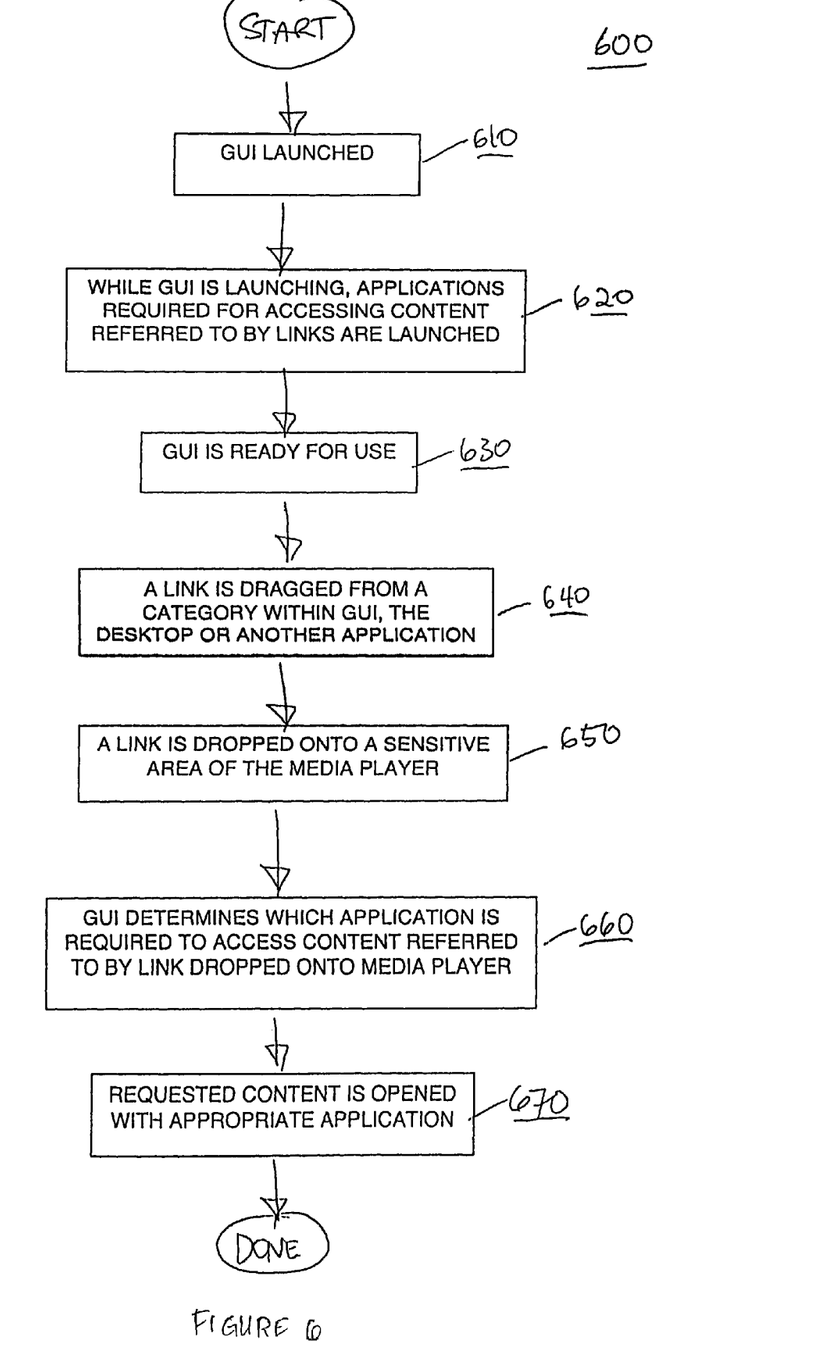
FIG. 6 is a flowchart demonstrating how content can be opened by dragging a link from a category within the GUI and dropping it onto a sensitive area on the media player within the GUI.

Another method of opening content using the GUI is shown in FIG. 6. FIG. 6 is a flowchart 600 illustrating how the user can open content by dragging a link from the desktop, another application, or any category within the GUI onto a sensitive area on the media player and dropping it on that sensitive area. First the GUI is launched (610). As the GUI is launching, the applications required to access content referred to by links within the GUI are launched (620). The GUI is then ready for use (630). A link is dragged (640) and dropped onto the sensitive area of the media player (650).

Upon the dropping of the link onto the sensitive area of the media player (650), the GUI consults the file associate table (see Table 1) and determines which application can be employed to access the content referred to by the selected link (660). The desired content is then opened in the appropriate application (670). If the link is dragged from a specialized category, the GUI does not consult the file association table (see Table 1). Instead, the content is opened in the application designated as the primary application for that specialized category.

While the methods illustrated in flow charts 400, 500 and 600 show specific sequences and quantity of steps, the present invention is suitable to alternative embodiments. For example, not all the steps provided for in the methods illustrated in flow charts 400, 500 and 600 are required for the present invention. Furthermore, additional steps can be added to the steps presented in the present embodiment. Likewise, the sequences of the steps can be modified depending upon the application.

The preferred embodiments of the present invention, a customizable, categorically organized graphical user interface for accessing online and local content, is thus described. While the present invention has been described in particular embodiments, it should be appreciated that the present invention should not be construed as limited by such embodiments, but rather construed according to the below claims.

What is claimed is:

1. A graphical user interface comprising:
   a plurality of on-screen elements displayed on a display screen of a computer system;
   a plurality of user-selectable, user customizable categories displaying user-customizable links to content on a network and content stored in the memory of said computer system and wherein an application required for accessing each instance of the content is automatically launched concurrently with initiating of said graphical user interface; and
   a media player for launching said content automatically when one of said links is dragged and dropped onto said media player.

2. The graphical user interface of claim 1, wherein said links can be created by dragging links from the desktop of said computer system and dropping them into a category within said graphical user interface.

3. The graphical user interface of claim 1, wherein the appearance of said links changes automatically when the content referred to changes.

4. A method for presenting content available on a computer system on a display screen of said computer system comprising:
   rendering a graphical user interface on said display screen;
   rendering a plurality of user-customizable categories within said graphical user interface;
   rendering a plurality of user-customizable links to content on a network and content stored in a memory of said computer system within said categories;
   automatically launching applications required for accessing said content concurrently with said rendering of said graphical user interface;
   rendering a media player within said graphical user interface; and
   automatically opening said content in response to the dragging of one of said links and dropping said link onto said media player.

5. The method of claim 4, wherein said links can be created by dragging links from the desktop of said computer system and dropping them into a category within said graphical user interface.

6. The method of claim 4, wherein said media player comprises a sensitive area for dragging and dropping links onto.

7. The method of claim 4, wherein said graphical user interface automatically opens said content in response to the clicking of a mouse on one of said links.

8. The method of claim 4, wherein said graphical user interface determines the file type of content referred to by a user-selected link and selects the proper application with which to open said content.

9. The method of claim 4, wherein said categories within said graphical user interface comprise non-user customizable unique identifiers.

10. The method of claim 4, wherein a user change is recorded and stored in a data file and wherein said user change is selected from the group consisting of a change to at least one of said plurality of user-customizable categories and a change to at least one of said plurality of user-customizable links.

11. The method of claim 10, wherein data regarding said user change is used to tailor communication to the user via push technology.

12. The method of claim 4, wherein said links to said content are not visible within said graphical user interface if said content no longer exists.

13. The method of claim 4, wherein a category within the graphical user interface is a specialized category comprising links which are opened in a predetermined application.

14. The method of claim 4, wherein the contents of more than one category are displayed simultaneously.

15. The method of claim 4, wherein the appearance of said links changes if said content referred to by said links changes.

16. The method of claim 4, wherein the appearance of said categories changes in response to input from a third party, via push technology through the internet.

17. The method of claim 4, wherein the appearance of said graphical user interface changes in response to input from a third party, via push technology through the internet.

18. The method of claim 4, wherein the appearance of said categories is user-customizable.

19. The method of claim 4, wherein the appearance of said graphical user interface is user-customizable.

20. The method of claim 4, wherein the locations of said categories within the graphical user interface is user-customizable.

* * * * *